(12) United States Patent
Saunders et al.

(10) Patent No.: US 7,766,540 B2
(45) Date of Patent: Aug. 3, 2010

(54) KITCHEN BLENDER

(75) Inventors: Craig M Saunders, Rocky River, OH (US); Jason G Tilk, Cleveland Heights, OH (US)

(73) Assignee: Nottingham-Spirk Design Associates, Inc., Cleveland, OH (US)

( * ) Notice: Subject to any disclaimer, the term of this patent is extended or adjusted under 35 U.S.C. 154(b) by 828 days.

(21) Appl. No.: 11/426,413

(22) Filed: Jun. 26, 2006

(65) Prior Publication Data

US 2007/0297281 A1 Dec. 27, 2007

(51) Int. Cl.
*A47J 43/044* (2006.01)
(52) U.S. Cl. ........................ 366/251; 366/601
(58) Field of Classification Search ................ 366/247, 366/249, 251, 601
See application file for complete search history.

(56) References Cited

U.S. PATENT DOCUMENTS

| | | | |
|---|---|---|---|
| 1,085,858 A | 2/1914 | Fulton | |
| 2,042,176 A | 5/1936 | Hausman | |
| 2,250,142 A * | 7/1941 | Umstead | 248/660 |
| 3,523,629 A | 8/1970 | Chi | |
| 4,010,934 A * | 3/1977 | McCord et al. | 366/142 |
| 4,151,792 A | 5/1979 | Nearhood | |
| 4,497,580 A | 2/1985 | Doyel | |
| D285,892 S | 9/1986 | Doyel | |
| 4,708,487 A | 11/1987 | Marshall | |
| 4,726,553 A * | 2/1988 | Wischusen, III | 248/146 |
| 4,738,542 A | 4/1988 | Hung | |
| 4,865,199 A * | 9/1989 | Zimmer | 206/515 |
| 4,946,286 A * | 8/1990 | Purkapile | 366/247 |
| 5,407,270 A * | 4/1995 | Barile et al. | 366/247 |
| 5,711,602 A | 1/1998 | Rohring et al. | |
| D413,226 S | 8/1999 | Barker | |
| 6,224,253 B1 * | 5/2001 | Dixon | 366/247 |
| D449,762 S | 10/2001 | Jacober et al. | |
| 6,513,966 B1 * | 2/2003 | Gort-Barten et al. | 366/205 |
| 6,817,750 B1 * | 11/2004 | Sands | 366/205 |
| 2002/0089894 A1 * | 7/2002 | Parlor, Sr. | 366/245 |
| 2003/0198124 A1 | 10/2003 | Glucksman et al. | |
| 2004/0174767 A1 | 9/2004 | Glucksman et al. | |
| 2005/0174882 A1 * | 8/2005 | Krasne et al. | 366/249 |

* cited by examiner

*Primary Examiner*—David L Sorkin
(74) *Attorney, Agent, or Firm*—Faye Sharpe LLP (57) ABSTRACT

A kitchen blender provides improved efficiency of mixing and cleaning by positioning the motor and electrical components in an enclosed top component which mounts snuggly into a pitcher with a smooth, easily cleaned interior surface and an enlarged base.

21 Claims, 7 Drawing Sheets

KITCHEN BLENDER

FIELD OF THE INVENTION

This invention relates generally to food an beverage blenders and more particularly to a household appliance for blending foods and beverages in preparation areas such as a kitchen.

BACKGROUND

Food and beverage blenders have been commercially available for many years. One type of blender comprises an electric motor in a base which drives a rotating boss in the top surface of the base. The top surface of the base also includes features which will support a blending vessel. The blending vessel is typically a pitcher with a narrow bottom and a wider top. The narrow bottom includes an opening accommodating a blender blade supported on a bottom plate. The bottom plate is fixed to the bottom opening of the blender vessel by means of sealing rings and a collar. A cap closes the blender vessel top. The assembled vessel is placed upon the base where the boss engages a receptacle fixed to the blade. Switches on the base allow the user to energize the motor which rotates the blade. Switches are provided for various blender speeds and pulsing. Such blenders are typically operated using household electric current. As such they are relatively powerful and provide a substantial blending movement to the contents of the blending vessel.

A second type of blender is a hand held, battery operated unit, in which a battery provides electric current to a low voltage motor. The motor drives a shaft having a blending blade at its end. Such hand held blenders are normally switched and can be used with a mixing bowl, measuring cup, or drinking glass to blend ingredients. Such blenders are normally powered by standard commercially available household batteries and provide relatively low blending power.

The counter top blenders described have the advantage of high power. However, they have the disadvantages of multiple parts, difficult cleaning, and potential leaks should the bottom of the blending vessel is incorrectly assembled. Moreover, because the bottom of the blending vessel is relatively small in comparison to the vessel size, such vessels are somewhat unstable when not positioned properly in the base of the blender. The hand held blenders have the advantage of being somewhat easier to clean. However, they are prone to splatter the ingredients being blended as the top of the vessel is often open. They are low powered and cannot perform blending of many materials as they lack the power of the counter top blenders.

SUMMARY OF THE INVENTION

The present invention contemplates a new and improved kitchen blender which overcomes many of the above-referred to problems and others. The present invention provides a kitchen blender which has the stability of a counter top blender with improved ease of cleaning and a stable blending vessel.

Briefly stated, in accordance with the invention, there is provided a blending vessel or pitcher having a permanently closed bottom and an open top; and, a blender top having an enclosed blender motor with a downwardly facing aperture accepting a shaft extending vertically downwardly into the blending vessel or pitcher with a blending blade at its bottom and a switch selectively sending current to the blender motor, the top being adapted to snugly fit into and close the top of the blending vessel with the axis of the blender tool shaft being offset from the central axis of the blending vessel.

Further in accordance with the invention, the blender vessel or pitcher is provided with an enlarged bottom to which mass has been added providing increased stability.

Yet further in accordance with the invention, an ergonomic handle is permanently attached to the side wall of the pitcher.

Yet further in accordance with the invention, the pitcher is provided with a spout comprising a segment of the pitcher side wall adjacent the top edge of the pitcher extending outwardly from said pitcher and said blender top includes a downwardly extending portion with a side wall which lies closely adjacent the interior side wall of the pitcher around its entire periphery and projects sufficiently into the pitcher to be adjacent the side wall under the spout thereby preventing splatters when the top is mounted on the pitcher.

Still further in accordance with the invention, the interior surface of the pitcher is smooth and not punctured by holes other than the top opening.

Still further in accordance with the invention, the pitcher handle top surface is provided with an indexing member which mates with an indexing member in the blender top assuring proper orientation of the top to the pitcher.

Still further in accordance with the invention, the motor in the top is closer to the handle than the center axis of the pitcher when the top is properly mounted on the pitcher whereby the mass of the pitcher and top assembled is concentrated near the handle making the pitcher easier to carry.

Still further in accordance with the invention at least one sensor is provided sensing when the top is fully engaged with the pitcher, the motor only being enabled when the top is fully engaged with the pitcher.

Yet further in accordance with the invention, a magnet is embedded in the pitcher handle or the pitcher side wall and a magnetic switch is fixed in the blender top downwardly extending portion so as to be adjacent the magnet when the top is fully mounted and aligned in the pitcher, the magnetic switch enabling operation of the blender motor only when adjacent the magnet.

Further in accordance with another aspect of the invention, a top is provided with a single operating switch and at least one hold down switch, both of which must be depressed to operate the blender motor.

Yet further in accordance with the invention a blender is provided with a pitcher having at least one tub for engaging t least one top engagement switch on the top when the top is fully mounted in a preferred orientation on the pitcher and the blender motor will only operate when the top is fully mounted in a preferred orientation and an operating switch and a hold down switch are depressed.

It is another object of the invention to provide at least one top engagement switch protected in a recess in the top.

It is a principal object of the present invention to provide a kitchen blender having improved stability which is easy to clean and has a minimal number of parts.

It is yet another object of the present invention to provide a kitchen blender having the power of a table top blender and a pitcher which is closed at its bottom.

It is still another object of the present invention to provide a kitchen blender which supplies improved blending by having the axis of the blending tool offset from the central line of the pitcher whereby the material to be blended is displaced vertically as well as horizontally.

It is still another object of the present invention to provide a blender which minimizes spatter of materials being blended during blending.

It is still another object of the present invention to provide a blender which will only operate when its top is properly seated in its pitcher whereby splattering of the blended material is avoided.

Further objects and advantages of the invention will be apparent from the following detailed description of the preferred embodiment thereof and from the accompanying drawings.

BRIEF DESCRIPTION OF THE DRAWINGS

The invention may take physical form in certain parts and arrangements of parts, a preferred of which will be described in detail and illustrated in the accompanying drawings which form a part hereof and wherein.

PREFERRED EMBODIMENTS

Figure 1:
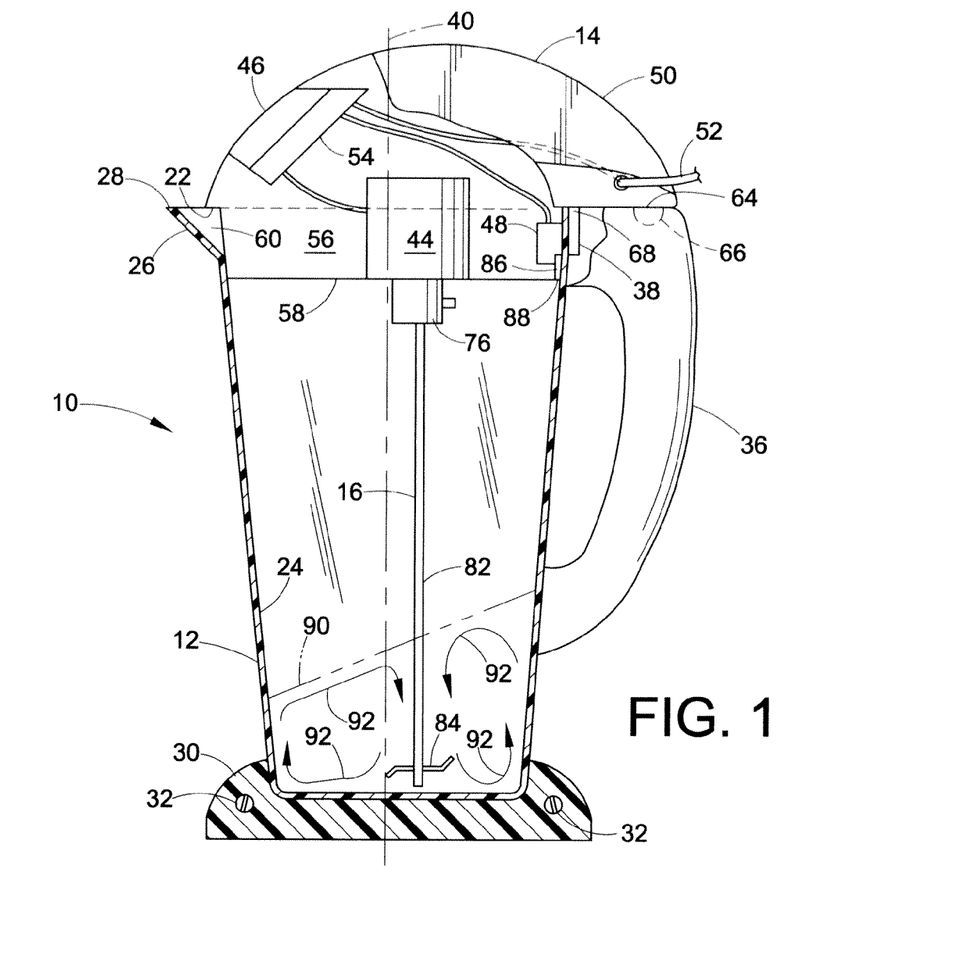
FIG. 1 is schematic side elevational view, partially in cross section; of the blender of the present invention with the top assembled to the pitcher.

Referring now to the drawings wherein the showings are for the purposes of illustrating preferred embodiments of the invention only and not for the purpose of limiting same, FIG. 1 shows a blender 10 in accordance with the present invention. The blender 10 comprises three separable elements; the blending vessel or pitcher 12, the top 14, and the blender tool 16. The pitcher 12 has a smooth generally flat bottom wall 22 and at least one side wall 24. Side wall 24 can be a single slightly conical side wall diverging slightly outwardly and upwardly. This gives the pitcher a circular cross section at most elevations. In this embodiment, the bottom wall is circular and the pitcher 12 has a shape resembling a water glass. The pitcher can have different shapes. For instance, the pitcher can be longer than it is wide, giving the pitcher an oval cross section in horizontal planes. Alternatively, the pitcher can be square or rectangular with rounded corners between the four walls giving the pitcher a square or rectangular cross section in horizontal planes. All of these shapes work well in the pitcher of the present invention. They provide a pitcher having an open top and a smooth continuous inner surface formed of a generally flat bottom which merges in a continuous smooth surface with a side wall which is smooth and continuous from bottom to top.

The pitcher side wall is provided with a spout 26 formed by the displacing a portion of the side wall adjacent the top edge 28 outwardly in a gently curved configuration. The pitcher 12 also has an enlarged base area. The base flares downwardly and outwardly and extends somewhat below the bottom wall 22. Optionally, the base includes additional mass 32 in the form of a metal ring or iron balls or rods molded into the base 30. The base 30 provides an enlarged flat footprint for the pitcher to improve stability. Alternatively, particularly if the pitcher 12 is formed of glass, the base can be integral to the bottom wall 22 and be a thickened glass bottom wall adding significant mass to the pitcher at its bottom and around its periphery.

Pitcher 12 also includes a handle 36 opposite the spout 26. The handle is ergonomic in that it is designed to be easily grippable and optionally can have a rubberized non-slip surface for easy handling. The handle 36 can be integrally molded with the pitcher 12 or, alternatively, can be a separate piece fixed to the pitcher by metal bands around the pitcher, adhesive bonding, mechanical fasteners or the like. The handle 36 also has magnet 38 embedded in the handle adjacent the top edge 28 of the side wall 24.

The pitcher 12 is generally symmetrical around a central vertical axis 40.

The top 14 comprises a motor 44, an operating switch 46, a mounting detector switch 48, a housing 58 and a power cord 52. The top 14 has a downwardly extending portion 56 which has a generally flat bottom wall 58 and a side wall 60. The side wall 60 has an exterior surface shaped to lay against the upper most portion of the pitcher side wall 24. Thus, if the pitcher has a generally cylindrical horizontal cross section, then the exterior surface of the side wall 60 is generally cylindrical and somewhat diverging outwardly and upwardly so as to lie closely against the interior surface of the picture side wall just below the pitcher top edge 28. As can be seen in FIG. 1, the side wall 60 of the downwardly extended portion 56 extends into the pitcher sufficiently engage the pitcher side wall 24 at the bottom of the spout 26. Thus, the top 14 closes the entire top opening of the pitcher 12 when the top 14 is correctly in the pitcher.

The top 14 is provided with a downwardly extending tab 64 in its bottom surface which, when the top is properly mounted on the pitcher, will be directly over the pitcher handle 36. The pitcher handle 36 is provided with a recess 66 accepting the tab 64 thus encouraging proper orientation of the top on the pitcher. The surfaces of the tab 64 and recess 66 are curved. The tab 64 will slide into correct orientation in the recess 66 if it is positioned somewhat off center to begin with.

When the tab 64 is correctly positioned in the recess 66, the mounting detector 48, which in this embodiment is a magnetic switch, lines up adjacent the magnet 38. This closes the switch 48.

The magnet 38 is positioned in the pitcher handle 36 either by molding in place or by providing a slot 68 into which the magnet 38 is inserted along with an adhesive or the like to hold it in place. The slot 68 can thereafter be filled concealing the magnet.

The top housing 50 has an outwardly extending lip 72 which surrounds the downwardly extending portion 56 and will sit on the top edge 28 of the pitcher 12. Positive positioning of the top 14 on the pitcher 12 is provided by the lip 72, downwardly extending portion 56 and tab 64.

The motor 44 includes a downwardly extending tool mounting 76 which penetrates through the bottom wall 58 of the housing 50. The tool mounting 76 rotates when the motor 44 is energized. The tool mounting 76 is conventional in design and has a vertically extending bore at its center. The tool 16 is held within the tool mounting 76. The tool 16 comprises a long straight cylindrical shaft 82 with an agitator blade 84 fixed at its lower end. A circular recess (not shown) is provided near the top of the shaft 82. A spring loaded ball is provided in the tool mounting 76 which will snap into the recess retaining the tool 16 in the tool mounting 76 but allowing its easy removal by tugging on it. This mounting mechanism and the configuration of the tool 16 is conventional.

As can be seen in FIG. 1, the tool shaft 82 is offset from and parallel to the axis 40 of the pitcher 12. The importance of this will be described along with the operation of the blender 10.

Figure 4:
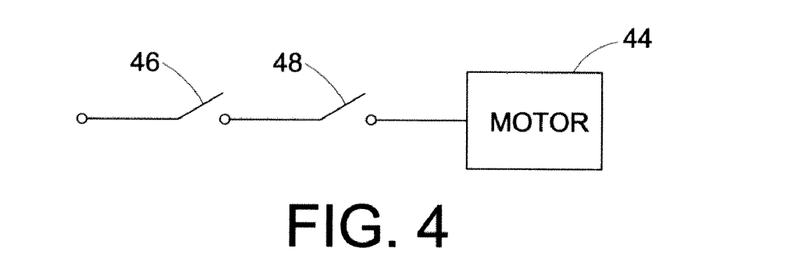
FIG. 4 is a simplified electrical schematic of the interconnection of the major elements of the blender seen in FIGS. 1-3.

The electrical interconnection of the principal elements in the top 14 is shown in FIG. 4. The operating switch 46 is connected to the source of power, generally the power cord, and the magnetic mounting detector switch 48. The mounting detector switch is in turn connected to the motor 44. If both the operating switch 46 and the mounting detector switch 48 are closed, power is provided to the motor and the tool is rotated. If either the operating switch 46 or the mounting detector switch 48 is open, power cannot flow to the motor and the tool will not rotate. As can be seen in FIG. 1, the top 14 must be positioned fully in the pitcher 12 or the magnetic switch 48 will not be sufficiently close to the magnet 38 and will remain open. This prevents operating the blender with the top not fully engaged to the pitcher. This prevents splattering of the contents of the pitcher by operation of the blender before it is fully closed. The preferred operating switch is a momentary contact switch which must be held closed.

The mounting detector switch 48 does not need to be a magnetic switch. If desired, the mounting detector switch can be a momentary contact mechanical switch with a tab extending outwardly from a surface on the top housing 50 which will engage the pitcher or handle when the top 14 is properly on the pitcher 12. For instance, the switch 48 can be mounted so that its actuating tab or button is contained in a slot extending upwardly in the downwardly extending portion 56 of the top. A tab 88 molded into the interior surface of the pitcher side wall 24 slides into the slot and pushes the switch button on the switch 48 only when the top 14 is properly seated in the pitcher 12. By placing the switch button in a recess or slot, accidental depression is avoided.

Figure 2:
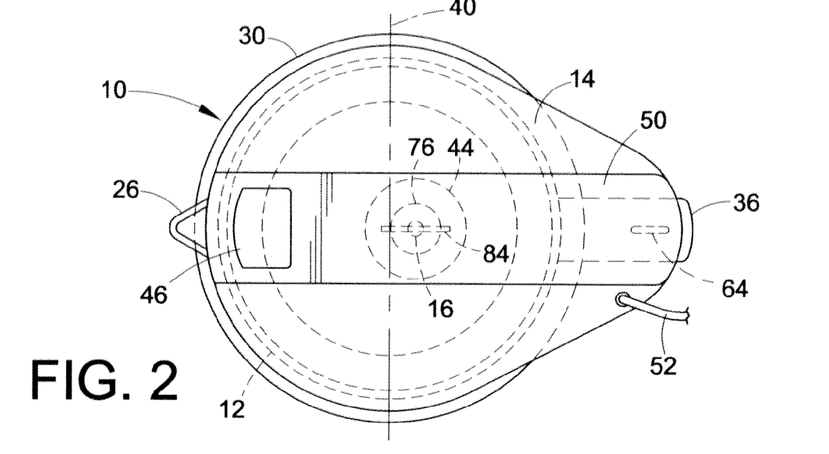
FIG. 2 is a top view of the blender with the top assembled to the pitcher.
Figure 5:
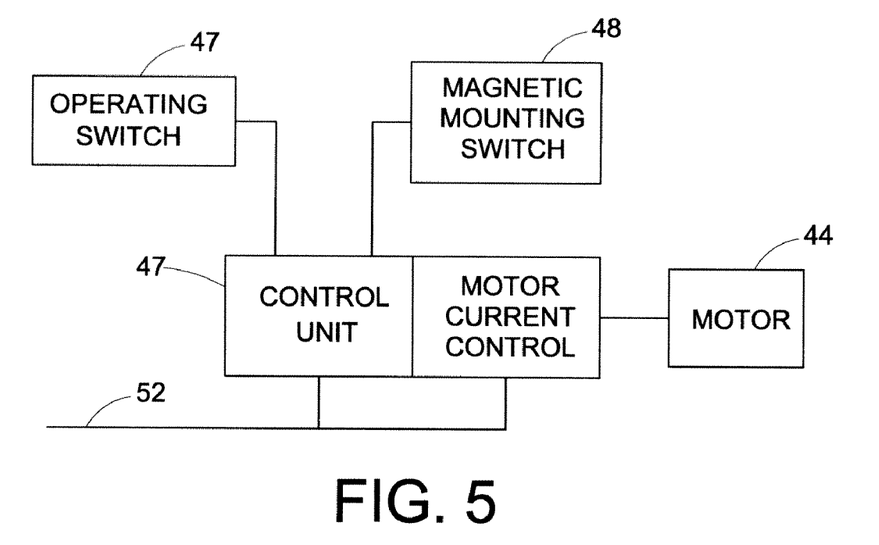
FIG. 5 is a simplified electrical schematic of an alternate electrical interconnection of the principal electrical elements of the blender of FIGS. 1-3.

The top of the blender 10 is seen in FIG. 2. The top covers most of the pitcher 12. The only portion of the pitcher 12 visible is the spout 26. The operating switch 46 is positioned in the top near the spout 26. The power cord 52 exits the top on the side of the top opposite the operating switch 46. The operating switch can be replaced with several operating switches if desired. Such a configuration is shown in FIG. 5 schematically. Several switches as for full power, low power and pulse 47 are provided in place of the single operating switch. Inputs from the operating switches 47 and the magnet mounting switch 48 are provided to a control unit/motor current control which controls the supply of electrical current to the motor 44. Current can be provided to the motor at full power, partial power or pulsed depending upon the inputs provided by the operating switches 47.

In operation, a user pours the ingredients to be blended into the pitcher 12, places the top onto and into the pitcher 12 properly aligning it as guided by the tab 64 and recess 66. The user can then plug the power cord 52 into an outlet, hold the top 14 in place with one hand depress the operating button 46 with the other. The tool 16 rotates blending the ingredients together. Importantly, because the tool shaft is not on the central axis of the pitcher, the ingredients undergo an improved blending. Materials are displaced within the pitcher toward that portion of the side wall proximate to the tool 16. This results in the level of ingredients rising to a greater height adjacent the side wall closest to the tool 16 and a significantly lesser height adjacent the side wall distant from the tool 16. This is shown schematically in FIG. 1 by the ingredient height line 90. This height mismatch is accompanied by a vortex creating circulation within the pitcher illustrated by the arrows 92. The ingredients are drawn downwardly by the action of the agitator blade 84. The ingredients are then driven radially outwardly toward the pitcher side wall where they rise toward the ingredient height line 90. The ingredients travel back toward the tool shaft 82 where they reenter the downwardly extending vortex. Ingredients also travel circumferentially around the tool shaft 82 as they follow the vortex inducing circulation. This causes the ingredients to be thoroughly mixed as the shape of vortex creating circulation changes as portions of the ingredients go from the lower side to the upper side. A very thorough, efficient mixing is provided.

Figure 3:
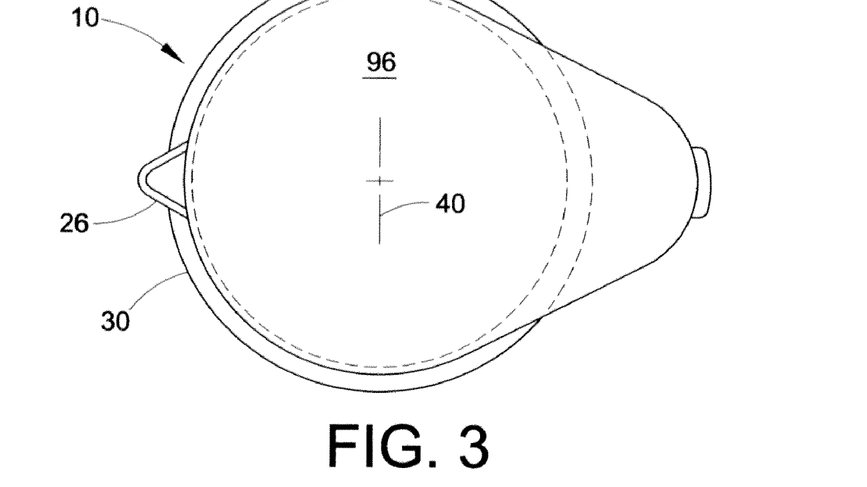
FIG. 3 is a top view of the blender of FIG. 1 with the top removed and a cap applied to the blender pitcher.

The above-described mixer is very stable in operation because of its expanded base and because of the close fit between the top and pitcher. When blending is completed, the top is removed and the tool 16 is removed from the top 14. The top is only soiled slightly as spatter on the bottom surface is generally the only item that needs to be cleaned up. The tool can be placed in the dishwasher. The pitcher 12 with its spout 28 can be used to dispense the blended food or beverage item. If the entire context of the pitcher 12 are not consumed, a cap 96 (FIG. 3) having a downwardly extending portion identically shaped to the downwardly extending portion 58 of the top and a lip identical in shape and size to the lip 72 of the top 14 is placed over the pitcher sealing it for storage. Because the pitcher has an enlarged base, it is stable and can be stored easily on a countertop or in a refrigerator. This is a significant advantage over many prior art table top high powered kitchen blenders which have a smaller base and may not be stable on a countertop or refrigerator shelf.

Figure 6:
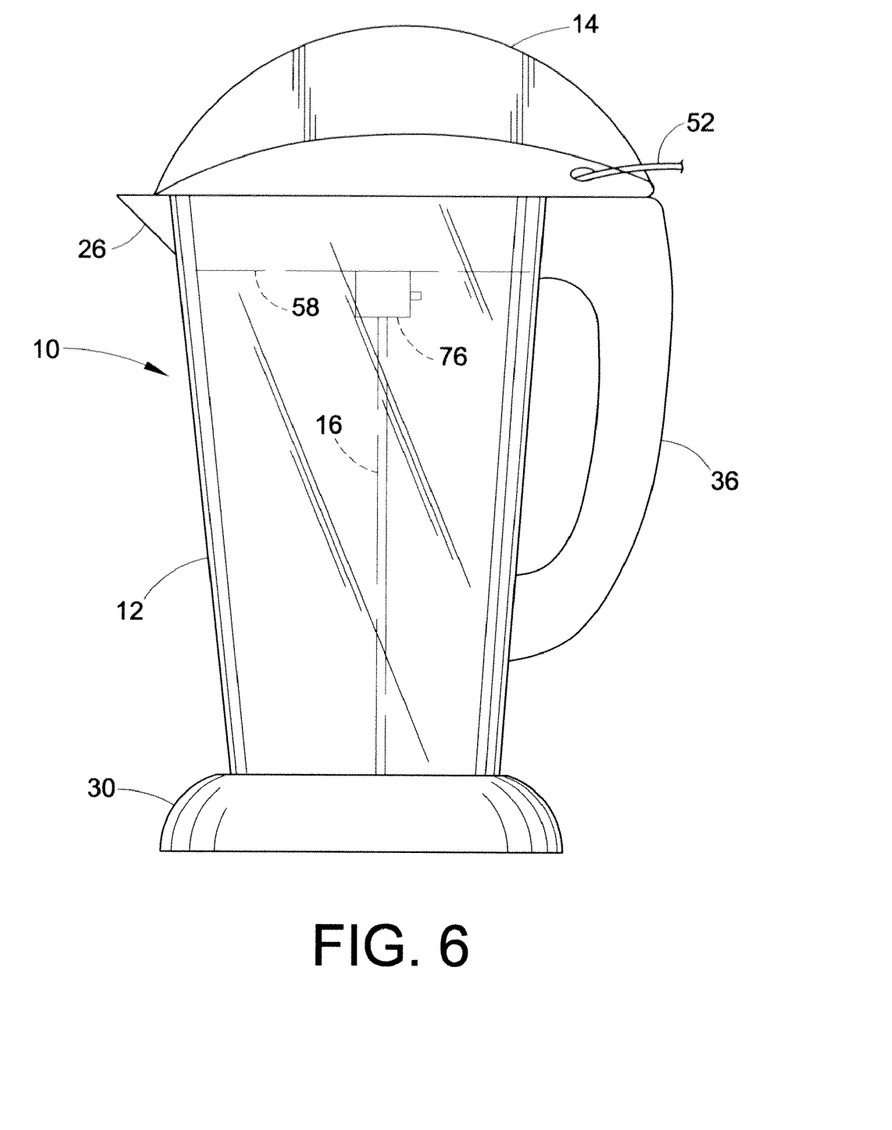
FIG. 6 is a photographic representation of the blender of FIGS. 1-3 in a side elevational view.
Figure 7:
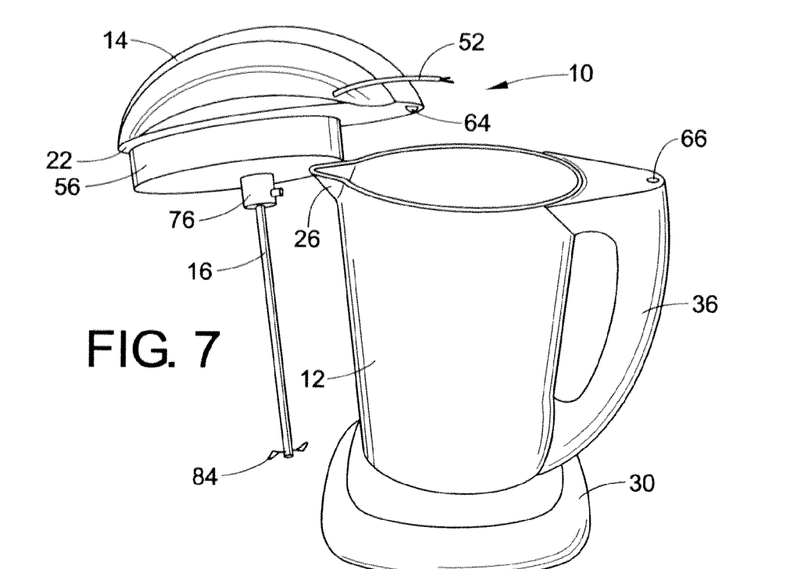
FIG. 7 is a perspective view of the prototype of FIG. 6 with the top removed and held to one side.

FIG. 6 shows the blender 10 of FIG. 1 fully assembly in a side elevational view. FIG. 7 shows the blender 10 of FIG. 1 in a perspective view with the top 14 removed. FIGS. 6 and 7 show with clarity the downwardly extending portion 56 of the top, the lip 72 of the top 14 and the close sealing fit achieved by these elements in the upper portion of the pitcher 12.

Another embodiment of the invention is shown in FIGS. 8-14. A blender 110 is comprised of a pitcher 112, a top 114, and a tool 116. The pitcher is made from glass or plastic and has a smooth continuous bottom wall 122 and a side wall 124. The side wall 124 has four somewhat flat segments interconnected by gentle curves. The side wall segments diverge outwardly and upwardly from a bottom wall 122 to a top edge 128. A spout 126 is provided in the top edge of one of the side segments where the topmost portion of the wall outwardly with respect to the rest of the wall to form a curved spout. The pitcher 112 also has an enlarged base 130 and an ergonomic handle 136. The enlarged base makes the pitcher more stable as a storage container either on a countertop or in a refrigerator. The tool 116 extends into the pitcher 112 offset from its vertical centerline. In other words, the tool 116 is closer to one side of the pitcher than another side. Thus far, the operational characteristics of this second embodiment of the pitcher are identical to the operational characteristics of the first pitcher described with respect to FIG. 1.

Figure 8:
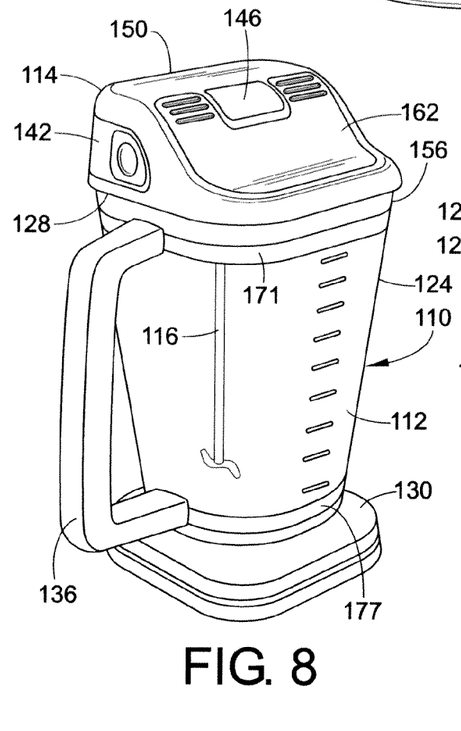
FIG. 8 is a perspective view of a second embodiment of the invention with the top in place on the pitcher.
Figures 10, 11:
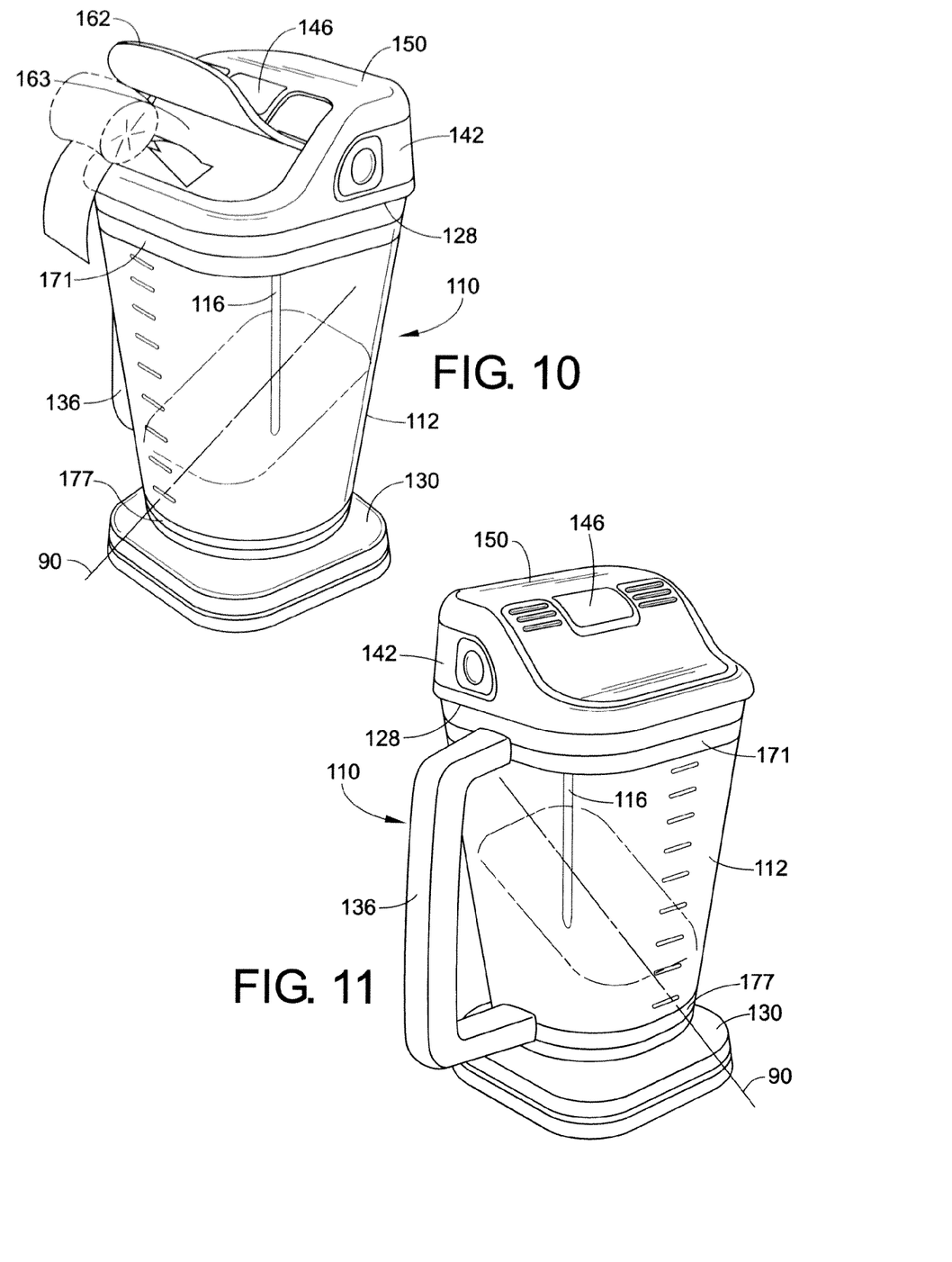
FIG. 10 is a perspective view of the embodiment of FIGS. 8 and 9 showing the body of fluid to be blended inside the blender and the introduction of additional elements into the blender.
FIG. 11 is a view similar to FIG. 10 showing the inclined top surface of the material being blended.

The top 114 seen in FIG. 8 differs from the top in FIG. 1. The top 114 seen in FIG. 8 includes a motor 44 (not shown) contained in a housing 150. The motor 144 is disposed directly above the tool 116 and drives the tool 116 in manner identical to the blender of the embodiment shown in FIG. 1. The top 114 has a single operating switch 146 disposed at the center of the upper surface of the housing 50. A top door 162 is hinged adjacent the operating switch 146 and can be pivoted into a vertical position opening a passage 163 (FIG. 10) through which ingredients can be introduced into the blender. As can be seen in FIG. 10, the passage 163 is almost the full width of the top and extends halfway across the other dimension of the top providing a generous opening for the introduction of ingredients into the pitcher 112.

The top 114 includes a downwardly extending portion 156 having a side wall with a contour matching the inner surface at the top of the pitcher 112. The side wall of the downwardly extending portion includes narrow slots (FIGS. 15 and 16) accommodating a portion of detector switches. One slot 151 is disposed in each of two opposite sides of the top 114. As can bee seen in FIGS. 15 and 16, the mounting detector switch assembly 148 comprises a slide 153 penetrating through the top housing 150, a switch 155 and a spring 157. The slide 153 is slidably mounted to the housing 150 by means of a pin 159 and slot 161. The spring 157 is fixed on bosses both on the housing 150 and on the slide 153. The spring biases the slide in an outward direction so that the slanted leading edge 163 is exposed in the slot 151. In this condition, the switch 155 is open. An enlarged portion of the top of the side wall 124 of the pitcher 112 is seen in FIG. 17 in cross section. A narrow tab 165 is integrally formed with the side wall 124. The narrow tab 165 is spaced downwardly from the top edge 128 of the side wall 124 and has a somewhat rounded outer upper corner 167. When the top 114 is seated upon the pitcher 112, the tab 165 enters the slot 151 and the slanted leading edge 163 of the slide 153 comes into contact with the rounded corner 167 of the tab 165. As the top 114 is pushed downwardly into a proper seated condition on the pitcher 112, the slide 153 is pushed into the top actuating the switch 155 and putting it into the closed condition. In the fully engaged state, a downwardly facing lip 172 surrounding the downwardly extending portion 56 of the top rests upon the top edge 128 of the pitcher 112, preventing further downward travel of the top 114 with respect to the pitcher 112. \ In the preferred embodiment of the invention, there is a mounting detector switch assembly 148 on two opposite sides of the top 114. There are also two tabs on the inner surface of the pitcher 112, on opposite sides of the pitcher in a position to engage the tabs.

Figure 14:
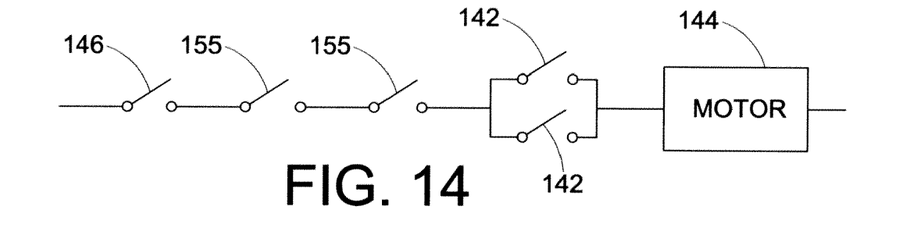
FIG. 14 is a simplified electrical schematic of the interconnection of the principal elements of the blender of FIGS. 8-13.
Figure 15:
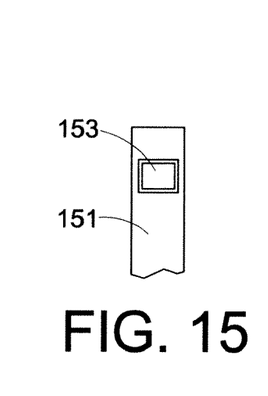
FIG. 15 is a plan view of a top engagement switch in the blender of FIGS. 8-13.
Figure 16:
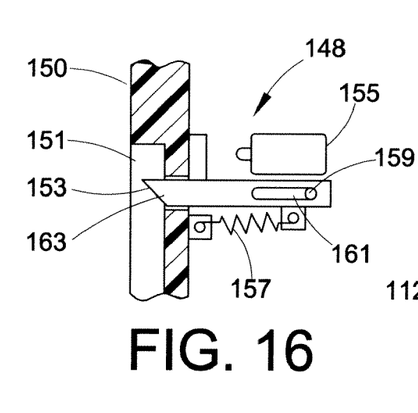
FIG. 16 is a partial cross section of the switch of FIG. 14.
Figure 17:
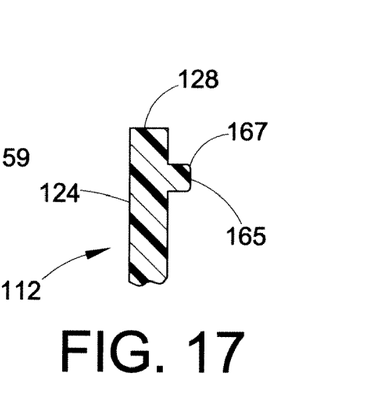
FIG. 17 is a cross section of a portion of the pitcher of FIGS. 8-13 showing the tab which engages the top engagement switch of FIGS. 15 and 16.

As can be seen in FIGS. 15 and 16, the slides 153 are contained within and protected by the slot 151. If one lays the top down on a flat surface with the side of the top containing a mounting detector switch assembly 148 facing downwardly, the slide 153 will not be engaged and the switch will not be closed. Also, the slot 151 is sufficiently narrow and the slide sufficiently deeply contained so that even should a user grasp the top at the slot 151, the finger will not it into the slot 151 and the slide 153 will not be depressed. The switch 155 will not be closed. As there is a slide in a slot on opposite sides of the top 114, and tabs appropriately positioned on opposite sides of the pitcher 112, both switch assemblies 148 will be actuated only when the top 114 is properly and fully seated in the pitcher 112. This prevents splatter and use of the tool other than in the fully engaged position in the blender pitcher. Referring again to FIG. 8, a hold down switch 142 is positioned on the side wall of the top 114 above the handle 136. An identical switch 142 is positioned identically on the opposite side of the top 114 as well. The electrical interconnection of the switches is shown schematically in FIG. 14. As can be seen in FIG. 14, the two hold down switches 142 are connected in parallel. The operating switch 146 and the two mounting detector switches 155 are connected in series. All of the switches are momentary contact switches and must be held closed This ensemble of switches is in the line providing current to the motor. In this arrangement, the user must be depressing the operating switch 146, one of the hold down switches 142 and the top must be full seated in the pitcher 112 for the motor to receive current. This assures two things. First, the top is fully engaged on the pitcher 112. Second, the user has a hand covering a portion of the top 114 and firmly engaging at least two buttons on the top. The configuration of the top with the handle seen in FIG. 8 is the preferred configuration. In this configuration, a user can have one hand firmly grasping the handle 136 while the other hand is engaging the buttons 142, 146 on the top. This can be done with the ingredient adding door 162 facing the user and is a very natural position with one hand grasping straight ahead and the other hand grasping at the side. This is a very stable configuration. If the top is rotated 90° in the pitcher, then the user would be grasping the pitcher with one hand on the handle directly in front of him and one hand on the actuation button and hold down switch directly in front as well which is a less comfortable position. The top of the present invention could be provided with four slots accepting tabs on the inside wall of the pitcher with only one or two of them containing switches. The preferred construction is two tabs on the inner wall of the pitcher and two mounting detecting switch assemblies 148 positioned to allow operation of the device only when the top is in the orientation seen in FIG. 8 or an orientation rotated 180° from that orientation.

The mounting detector switch of the embodiment shown in FIG. 8 comprises a pair of tabs on opposite walls of the pitcher 112 and slots on opposite walls of the top 114. The mounting detector arrangement could be the magnetic switch and magnets used in the embodiment of FIG. 1 in this embodiment as well. Further, tabs and mechanical switches could be used in the embodiment of FIG. 1. Other detectors such as capacitive detectors or other mechanical or electrical engagement detectors known in the art could just as easily be used. Any appropriate detector useful as an interlock can be used in the circuits described above to assure that the top is properly seated on the pitcher 112 before the motor 144 is actuated.

Figure 9:
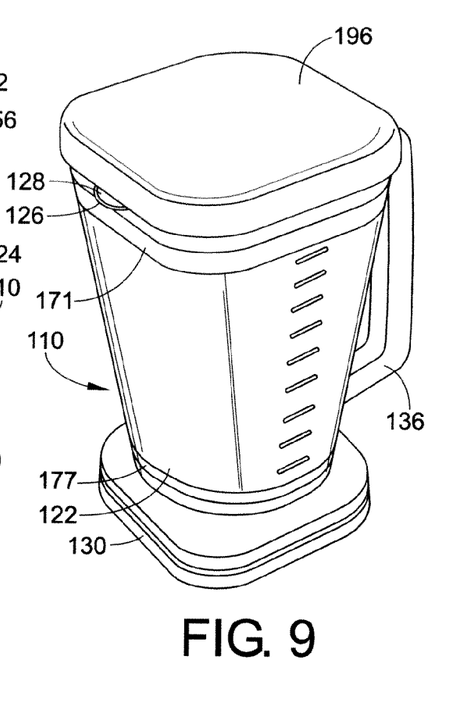
FIG. 9 is a perspective view of the embodiment of FIG. 8 with the top removed and a cap put on the pitcher in place of the top.

FIG. 9 shows pitcher 112 of FIG. 8 closed by a cap 196 for storage. The cap 196 has a downwardly extending portion with side wall which closely matches the interior side wall contour of the pitcher. Moreover, this downwardly extending portion extends sufficiently downwardly into the pitcher to close off the spout. Because of the expanded base 130, the pitcher 112 is stable and can be stored easily on a countertop or in a refrigerator with an airtight cap preserving the contents.

FIG. 10 shows several aspects of the embodiment of FIG. 8 not seen in the other figures. The hold down switch 142 on the side of the top not seen in FIG. 8 is seen in FIG. 10. The door 162 which opens the passage 163 is show in the open position in FIG. 10. its large size and the ability to add larger size ingredients through this door is illustrated. The ingredient height line is shown in FIG. 10 as if the blender was actuated. This would not normally be the case because with the door 162 open, the operating switch and hold down switch 142 would be very difficult to hold down.

As seen in FIG. 10, the ingredient height line 90 slopes from a high position near the side wall of the pitcher 112 closest to the tool 116 to a low position on the side of the pitcher remote from the tool 116. The action of the tool 116 forces ingredients down along the shaft of the tool 116 where they circulate outwardly and come up at the side walls of the pitcher. As can be seen in FIG. 10, there is also a circumferential component to this circulation with the ingredients traveling in the same direction, clockwise or counter clockwise, as the rotation of the tool 116. This does two things in the present embodiment. First, a very efficient thorough mixing action is provided as the radial circulation path changes from high and narrow on side to low and wide on the other side as material circulates circumferentially. Second, in the case of the semi solid ingredient mix, when one deactivates the motor to add additional materials, the low point of the ingredient pile is directly below the axis door 162. Materials can be introduced with a minimum of splashing and the door closed for further blending.

FIG. 11 is a view identical to that seen in FIG. 10 except ingredients are shown in the pitcher 112 and the orientation of the ingredient height line 90 made apparent.

Figure 12:
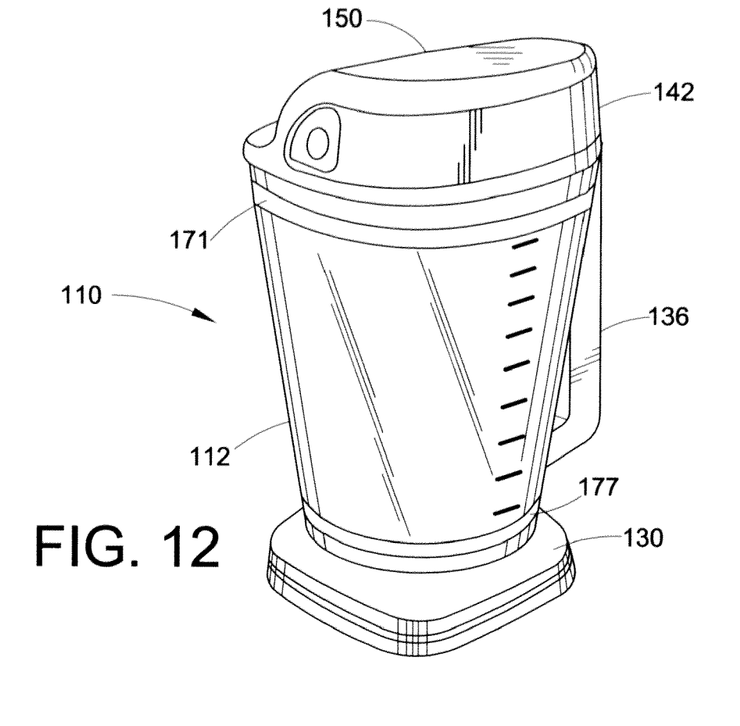
FIG. 12 is a perspective view taken 180° around the blender from FIG. 11 showing the incline top surface of the material being blended.
Figure 13:
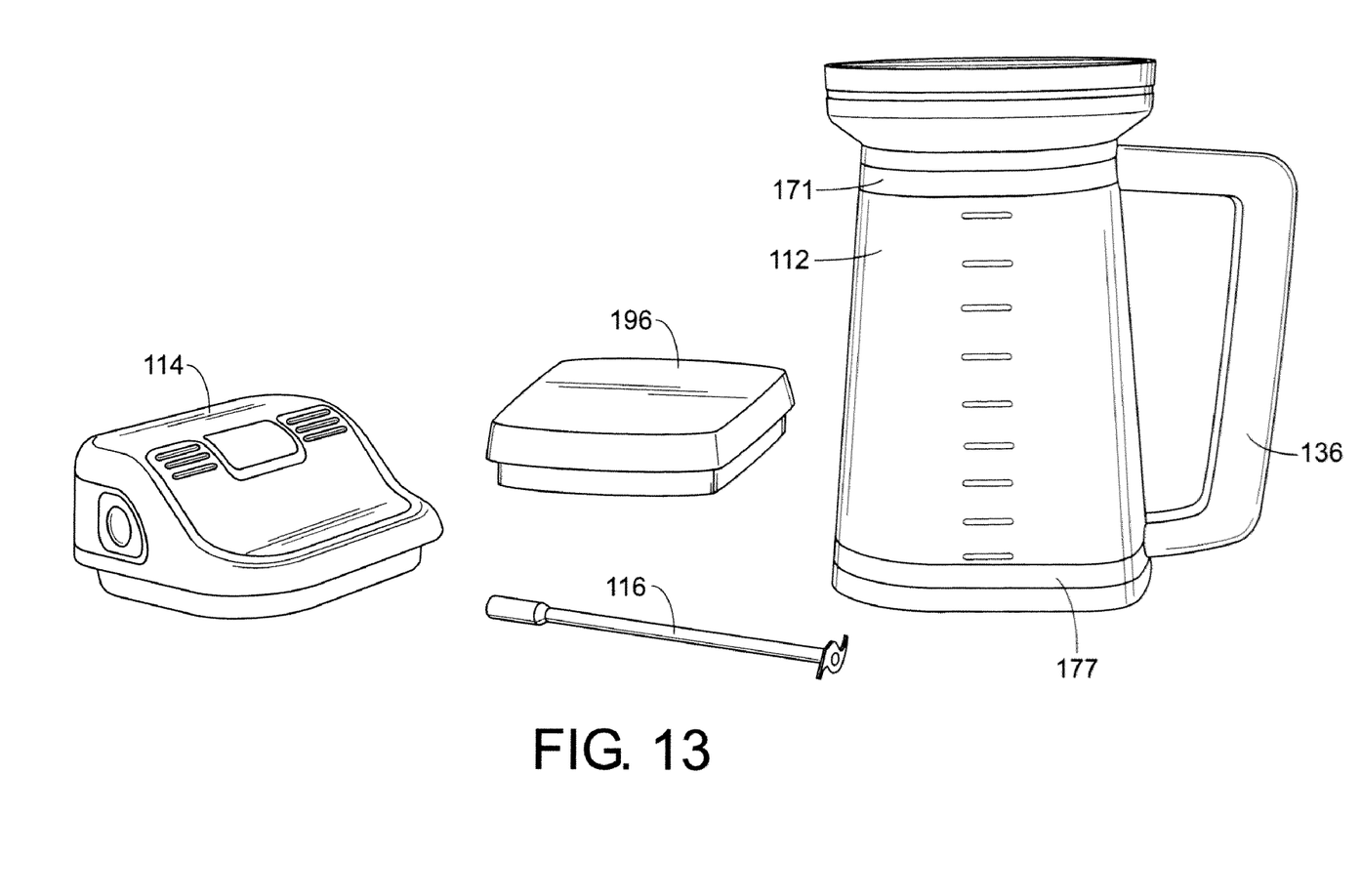
FIG. 13 shows the four separable components of the blender seen in FIGS. 8-12 disassembled from one another.

FIG. 12 is a view of the assembled blender of FIG. 8 in an orientation opposite to that of FIG. 11 showing the highest point on the ingredient height line 90. FIG. 13 shows the four major components of the blender of FIG. 8 in a disassembled state with the pitcher upside down. The tool 116 is disconnected from the top 114. With reference to the pitcher 112, one sees a mounting arrangement for the handle 136 useful when the pitcher is formed from glass. In this embodiment, metal bands 171 are fixed to the handle 136 at its top and bottom. These metal bands surround the pitcher 112 and are accommodated in grooves formed in the pitcher for this purpose. These metal bands are independent of the mechanism used to assure full seating of the top 114 in the pitcher 112 in this embodiment. However, should one desire to use magnets in the pitcher 112 and magnetic switchers in the top 114, the magnets can be positioned in recesses in the pitcher 112 under the top metal band 177.

The invention has been described with reference to preferred embodiments. It will be appreciated that modifications or alterations could be made without deviating from the present invention. Such modifications and alterations will occur to others upon the reading and understanding of the specification. It is intended that all such modifications and alterations be included insofar as they come within the scope of the appended claims or the equivalents thereof.

The invention claimed is:

1. A kitchen blender comprising a pitcher having a closed bottom, an open top, and a central vertical axis;
   a removable rotatable tool comprising a shaft having an axis and at least one agitator, said tool axis being offset from said pitcher central vertical axis wherein said tool is mounted in said blender;
   a top having a housing, an outer surface, a downwardly facing portion adapted to engage said pitcher open top, a tool mount releasably accepting said tool, said removable rotatable tool extending from said downwardly facing portion when held in said mount, a power cord, a motor contained within said top housing and a manually operable operating switch and at least one manually operable hold down switch, both said operating switch and said at least one hold down switch being positional in said top outer surface, said switches selectively providing utility current from said power cord to said motor and rotating said tool only when both said operating switch and at least one of said at least one hold down switch are actuated; and,
   said pitcher having a flat bottom with a base extending downwardly and outwardly providing an enlarged footprint and mass distributed about said flat bottom providing stability.

2. The blender of claim 1 wherein said to downwardly facing portion includes a downwardly extending portion adapted to extend into said pitcher open top.

3. The blender of claim 2 wherein said pitcher has at least one side wall having an interior surface and said top downwardly extending portion has at least one side wall having an exterior surface, said exterior surface proximate to said interior surface when said top is engaged with said pitcher.

4. The blender of claim 3 wherein said pitcher has a spout comprising a portion of said pitcher side wall adjacent said pitcher top extending outwardly from said pitcher; and, said top downwardly extending portion is adapted to extend sufficiently within said pitcher such that said exterior surface is proximate to said pitcher interior surface below said spout.

5. The blender of claim 1 wherein said pitcher has a smooth interior surface without holes.

6. The blender of claim 1 wherein said pitcher has a handle which extends from an exterior side wall.

7. The blender of claim 6 where said handle has an upwardly facing alignment member and said top has a downwardly facing alignment member adapted to engage said upwardly facing alignment member when said top is engaged with said pitcher in a preferred alignment.

8. The blender of claim 7 wherein, when said top is assembled to said pitcher, said top has a center of mass on the side of said pitcher central vertical axis adjacent said handle.

9. The blender of claim 8 wherein said motor is disposed above said tool and said tool is adapted to extend downwardly into said pitcher between said pitcher central vertical axis and said handle.

10. The blender of claim 8 wherein said top, when mounted on said pitcher, extends over said handle.

11. The blender of claim 1 further comprising a mounting detector detecting when said top is mounted on said pitcher and enabling operation of said motor if and only if said top is mounted on said pitcher.

12. The blender of claim 11 wherein said detector comprises a sensor on said top and a sensed element on said pitcher.

13. The blender of claim 1 further comprising a removable cap adapted to close said pitcher when said blender top is removed.

14. A kitchen blender comprising:
   a pitcher having a closed bottom, an open top, and a central vertical axis, said pitcher having a flat bottom with a base extending downwardly and outwardly providing an enlarged footprint and mass distributed about said flat bottom providing stability;
   a removable rotatable tool comprising a shaft and an agitator; and,
   a top having a housing, an outer surface, a downwardly facing portion adapted to engage said pitcher open top, a tool mount releasably accepting said tool, said removable rotatable tool extending from said downwardly facing portion, a power cord, a motor contained within said top housing adapted to rotate said tool, a manually operable operating switch in said top controlling flow of utility current from said power cord to said motor, said tool shaft being offset from said central vertical axis of said pitcher, said top additionally comprises at least one manually actuated hold down switch at least one of which must be actuated along with said operating switch to energize said motor, said operating switch and said at least one hold down switch being located in said outer surface.

15. The blender of claim 14 further comprises at least one mounting detector switch detecting if said top is mounted on said pitcher and enabling operation of said motor if and only if said top is mounted on said pitcher.

16. The blender of claim 15 wherein said top has a center and two mounting detector switches and said mounting detector switches are disposed on opposite sides of said center.

17. The blender of claim 16 wherein said pitcher has a handle and said mounting detector switches are positioned in said top such that said motor will be enable only when one of said mounting detector switches is adjacent said handle and the other of said mounting detector switches is remote from said handle.

18. The blender of claim 17 wherein said top has two hold down switches, one adjacent each mounting detector.

19. The blender of claim 18 wherein said hold down switches and said operating switch are on all momentary contact switches and said blender will operate only when said operating switch and one of said hold down switches are both depressed.

20. The kitchen blender of claim 14 wherein said pitcher has an enlarged base extending downwardly and outwardly providing an enlarged footprint for said pitcher.

21. A blender comprising:
- a mixing vessel having a closed bottom, an open top, a central vertical axis and a base enlarged when compared to the portion of the mixing vessel immediately above said base, said base providing said mixing vessel with an enlarged footprint;
- a removable rotatable tool having a shaft and an agitator; and,
- a top having a housing, an outer surface, a downwardly facing portion adapted to engage and close said mixing vessel open top, a tool mount releasably accepting said removable rotatable tool with said tool extending from said downwardly facing portion with its shaft offset from the central vertical axis of said mixing vessel, a motor contained within said top housing adapted to rotate said tool, a manually operable operating switch and at least one manually operable hold down switch, both said operating switch and said at least one hold down switch being positional in said top outer surface, said switches selectively providing current to said motor and rotating said tool only when both said operating switch and at least one of said at least one hold down switch are actuated such that ingredients within said mixing vessel are blended with the top surface of said ingredients being higher at the side of said blender close to said tool shaft and lower at the side of said blender remote from said tool shaft.

* * * * *